US012748027B2

(12) United States Patent
Kondo

(10) Patent No.: US 12,748,027 B2
(45) Date of Patent: Sep. 29, 2026

(54) SPECIFIC GRAVITY MEASUREMENT DEVICE

(71) Applicant: Alfa Mirage Co., Ltd., Osaka (JP)

(72) Inventor: Sadanori Kondo, Osaka (JP)

(73) Assignee: Alfa Mirage Co., Ltd., Osaka (JP)

( * ) Notice: Subject to any disclaimer, the term of this patent is extended or adjusted under 35 U.S.C. 154(b) by 291 days.

(21) Appl. No.: 18/512,104

(22) Filed: Nov. 17, 2023

(65) Prior Publication Data

US 2024/0102905 A1 Mar. 28, 2024

Related U.S. Application Data

(63) Continuation of application No. PCT/JP2021/044647, filed on Dec. 6, 2021.

(30) Foreign Application Priority Data

May 18, 2021 (JP) ................................ 2021-083619

(51) Int. Cl.

*G01N 9/08* (2006.01)
*G01N 9/36* (2006.01)
*G01N 35/00* (2006.01)

(52) U.S. Cl.

CPC ................ *G01N 9/36* (2013.01); *G01N 9/08* (2013.01); *G01N 35/00722* (2013.01); *G01N 35/0092* (2013.01); *G01N 2035/00891* (2013.01); *G01N 2035/0096* (2013.01)

(58) Field of Classification Search

CPC ...... G01N 9/36; G01N 9/08; G01N 35/00722; G01N 35/0092; G01N 2035/00891; G01N 2035/0096; G01N 9/00; G01N 2201/12723; G01N 2201/12753
USPC ..... 73/1.13, 1.15, 32 R, 433, 435, 436, 437, 73/1.01, 32 A, 866.3
See application file for complete search history.

(56) References Cited

FOREIGN PATENT DOCUMENTS

| | | | |
|---|---|---|---|
| CN | 211318091 | U | 8/2020 |
| JP | 6265541 | U | 4/1987 |
| JP | 517544 | U | 3/1993 |
| JP | 2006126163 | A | 5/2006 |
| JP | 201038688 | A | 2/2010 |
| JP | 5419943 | B2 | 2/2014 |

*Primary Examiner* — Robert R Raevis
(74) *Attorney, Agent, or Firm* — Farber LLC

(57) ABSTRACT

A specific gravity measurement device has an in-air weight sensor that measures the weight, in air, of an object to be measured, memory that automatically stores the weight in air, an in-liquid weight sensor that measures the weight, in a liquid, of the object to be measured, a memory that automatically stores the weight in the liquid, a measuring device that, on the basis of the weight in air and the weight in a liquid, measures the specific gravity of the object, and an initialization device that automatically initializes the display of the specific gravity of the object, after the object to be measured is retrieved from within the liquid.

8 Claims, 3 Drawing Sheets

SPECIFIC GRAVITY MEASUREMENT DEVICE

FIELD OF THE INVENTION

The present invention relates to a specific gravity measurement device for measuring specific gravity of solids.

BACKGROUND OF THE INVENTION

An example of a known specific gravity measurement device is disclosed in Japanese Patent Publication No. 5419943. Such specific gravity measurement device is composed of a liquid tank, an object-to-be-measured receiving member which is accommodated in the liquid tank via a support means in a non-contact manner and into and out of which a liquid in the liquid tank can flow freely, a mid-air mounting member which is supported by the support means and on which an object to be measured is placed for measuring a weight of the object to be measured in air, and a measuring device receiving and supporting the object-to-be-measured receiving member via the support means. The measuring device includes a sensor for converting a weight acting on the object-to-be-measured receiving member into an electric signal and a measuring unit for measuring specific gravity of the object to be measured from an output of the sensor when the object to be measured is placed on the mid-air mounting member and an output of the sensor when the object to be measured is submerged and placed on the object-to-be-measured receiving member.

SUMMARY OF THE INVENTION

The specific gravity measurement device as described above has an advantage that the mid-air mounting member does not need to be opened and closed each time and the measurement accuracy of the specific gravity can be improved, but has the following problem. More specifically, the specific gravity measurement device as described above requires such work that after the weight of the object to be measured is measured in air, an input key is pressed to store the weight in a memory, and after the weight of the object is measured in liquid, the input key is pressed to store the weight in the memory, and after the specific gravity of the object is measured, the input key is pressed to initialize a display on the display unit. Accordingly, there is a problem that vibration caused by pressing the input key is applied to the specific gravity measurement device, the vibration affects a measured value, and a measurement error may be caused.

Accordingly, in view of the foregoing problem, it is an object of the present invention to provide a specific gravity measurement device capable of significantly reducing measurement errors and repeatedly measuring a true specific gravity value.

The foregoing object of the present invention is achieved by the following means. It is noted that reference signs of an embodiment to be described later are added in parentheses, but the present invention is not limited thereto.

According to the first aspect of the present invention, a specific gravity measurement device (1) is characterized by including a display means (display unit 8*g*) for displaying a predetermined content,

- an in-air weight measurement means (sensor 7, CPU 8*c*) for measuring a weight of an object to be measured (M) in air,
- an in-air weight storage means (RAM 8*e*) for automatically storing the weight in air measured by the in-air weight measurement means (sensor 7, CPU 8*c*),
- an in-liquid weight measurement means (sensor 7, CPU 8*c*) for measuring a weight of the object to be measured (M) in a liquid,
- an in-liquid weight storage means (RAM 8*e*) for automatically storing the weight in the liquid measured by the in-liquid weight measurement means (sensor 7, CPU 8*c*),
- a measuring means (CPU 8*c*) for measuring specific gravity of the object to be measured (M) based on the weight in air stored in the in-air weight storage means (RAM 8*e*) and the weight in the liquid stored in the in-liquid weight storage means (RAM 8*e*), and
- an initialization means (CPU 8*c*) for automatically initializing a display of the specific gravity of the object to be measured (M) measured by the measuring means (CPU 8*c*) and displayed on the display means (display unit 8*g*) after the object to be measured (M) is taken out of the liquid.

On the other hand, according to the second aspect of the present invention, a specific gravity measurement device (1) is characterized by including a display means (display unit 8*g*) for displaying a predetermined content,

- an in-liquid weight measurement means (sensor 7, CPU 8*c*) for measuring a weight of an object to be measured (M) in a liquid,
- an in-liquid weight storage means (RAM 8*e*) for automatically storing the weight in the liquid measured by the in-liquid weight measurement means (sensor 7, CPU 8*c*),
- a measuring means (CPU 8*c*) for measuring specific gravity of the object to be measured (M) based on a weight of the object to be measured (M) in air and the weight in the liquid stored in the in-liquid weight storage means (RAM 8*e*), and
- an initialization means (CPU 8*c*) for automatically initializing a display of the specific gravity of the object to be measured (M) measured by the measuring means (CPU 8*c*) and displayed on the display means (display unit 8*g*) after the object to be measured (M) is taken out of the liquid.

On the other hand, according to the third aspect of the present invention, the specific gravity measurement device (1) according to the above first aspect is characterized in that the in-air weight storage means (RAM 8*e*) automatically stores the weight when a difference in the weight of the object to be measured (M) in air measured by the in-air weight measurement means (sensor 7, CPU 8*c*) falls within a first predetermined range set in advance (for example, see step S3), or automatically stores the weight after a first predetermined time has passed since the difference fell within the first predetermined range (for example, see step S3).

On the other hand, according to the fourth aspect of the present invention, the specific gravity measurement device (1) according to the first aspect or the second aspect above is characterized in that the in-liquid weight storage means (RAM 8*e*) automatically stores the weight when a difference in the weight of the object to be measured (M) in the liquid measured by the in-liquid weight measurement means (sensor 7, CPU 8*c*) falls within a second predetermined range set in advance (for example, see step S7), or automatically stores the weight after a second predetermined time has passed since the difference fell within the second predetermined range (for example, see step S7).

On the other hand, according to the fifth aspect of the present invention, the specific gravity measurement device (1) according to the first aspect or the second aspect above is characterized in that the initialization means (CPU 8*c*) automatically initializes the display of the specific gravity displayed on the display means (display unit 8*g*) when a value measured by the in-liquid weight measurement means (sensor 7, CPU 8*c*) falls within a third predetermined range set in advance (for example, see step S12) after the object to be measured (M) is taken out of the liquid.

Next, advantageous effects of the present invention will be described with reference signs in the drawings. It is noted that reference signs of an embodiment to be described later are added in parentheses, but the present invention is not limited thereto.

According to the first aspect of the present invention, the measured weight of the object to be measured (M) in air is automatically stored in the in-air weight storage means (RAM 8*e*), the measured weight of the object to be measured (M) in the liquid is automatically stored in the in-liquid weight storage means (RAM 8*e*), the specific gravity of the object to be measured (M) is measured by the measuring means (CPU 8*c*) based on the weight of the object to be measured (M) in air stored in the in-air weight storage means (RAM 8*e*) and the weight of the object to be measured (M) in the liquid stored in the in-liquid weight storage means (RAM 8*e*), and the measured specific gravity is displayed on the display means (display unit 8*g*). When the object to be measured (M) is taken out of the liquid, the display of the specific gravity displayed on the display means (display unit 8*g*) is automatically initialized by the initialization means (CPU 8*c*). This makes it possible to automate the specific gravity measurement work, thereby eliminating the need to press the input key as in the conventional case, so that measurement errors due to artificial vibration can be reduced substantially close to zero. As a result, according to the present invention, measurement errors can be significantly reduced, and thus, a true specific gravity value can be repeatedly measured.

On the other hand, according to the second aspect of the present invention, the measured weight of the object to be measured (M) in the liquid is automatically stored in the in-liquid weight storage means (RAM 8*e*), the specific gravity of the object to be measured (M) is measured by the measuring means (CPU 8*c*) based on the weight of the object to be measured (M) in air and the weight of the object to be measured (M) in the liquid stored in the in-liquid weight storage means (RAM 8*e*), and the measured specific gravity is displayed on the display means (display unit 8*g*). When the object to be measured (M) is taken out of the liquid, the display of the specific gravity displayed on the display means (display unit 8*g*) is automatically initialized by the initialization means (CPU 8*c*). This makes it possible to automate the specific gravity measurement work, thereby eliminating the need to press the input key as in the conventional case, so that measurement errors due to artificial vibration can be reduced substantially close to zero. As a result, according to the present invention, measurement errors can be significantly reduced, and thus, a true specific gravity value can be repeatedly measured.

On the other hand, according to the third aspect of the present invention, the in-air weight storage means (RAM 8*e*) automatically stores the weight when the difference in the weight of the object to be measured (M) in air measured by the in-air weight measurement means (sensor 7, CPU 8*c*) falls within the first predetermined range set in advance (for example, see step S3), or automatically stores the weight after the first predetermined time has passed since the difference fell within the first predetermined range set in advance (for example, see step S3). As a result, the in-air weight storage means (RAM 8*e*) can automatically store the weight of the object to be measured (M) in air with high measurement accuracy.

On the other hand, according to the fourth aspect of the present invention, the in-liquid weight storage means (RAM 8*e*) automatically stores the weight when the difference in the weight of the object to be measured (M) in the liquid measured by the in-liquid weight measurement means (sensor 7, CPU 8*c*) falls within the second predetermined range set in advance (for example, see step S7), or automatically stores the weight after the second predetermined time has passed since the difference fell within the second predetermined range (for example, see step S7). As a result, the in-liquid weight storage means (RAM 8*e*) can automatically store the weight of the object to be measured (M) in the liquid with high measurement accuracy.

On the other hand, according to the fifth aspect of the present invention, the display of the specific gravity displayed on the display means (display unit 8*g*) is automatically initialized when the value measured by the in-liquid weight measurement means (sensor 7, CPU 8*c*) falls within the third predetermined range set in advance (for example, see step S12) after the object to be measured (M) is taken out of the liquid. As a result, the occurrence of troubles such as a situation where the display disappears although the specific gravity of the object to be measured (M) is not checked can be reduced.

DETAILED DESCRIPTION OF THE INVENTION

Hereinafter, a preferred embodiment of a specific gravity measurement device according to the present invention will be described in detail with reference to the drawings. It is noted that, in the following description, when vertical and horizontal directions are indicated, it shall mean vertical and horizontal directions when viewed from the front of the figure.

Figure 1:
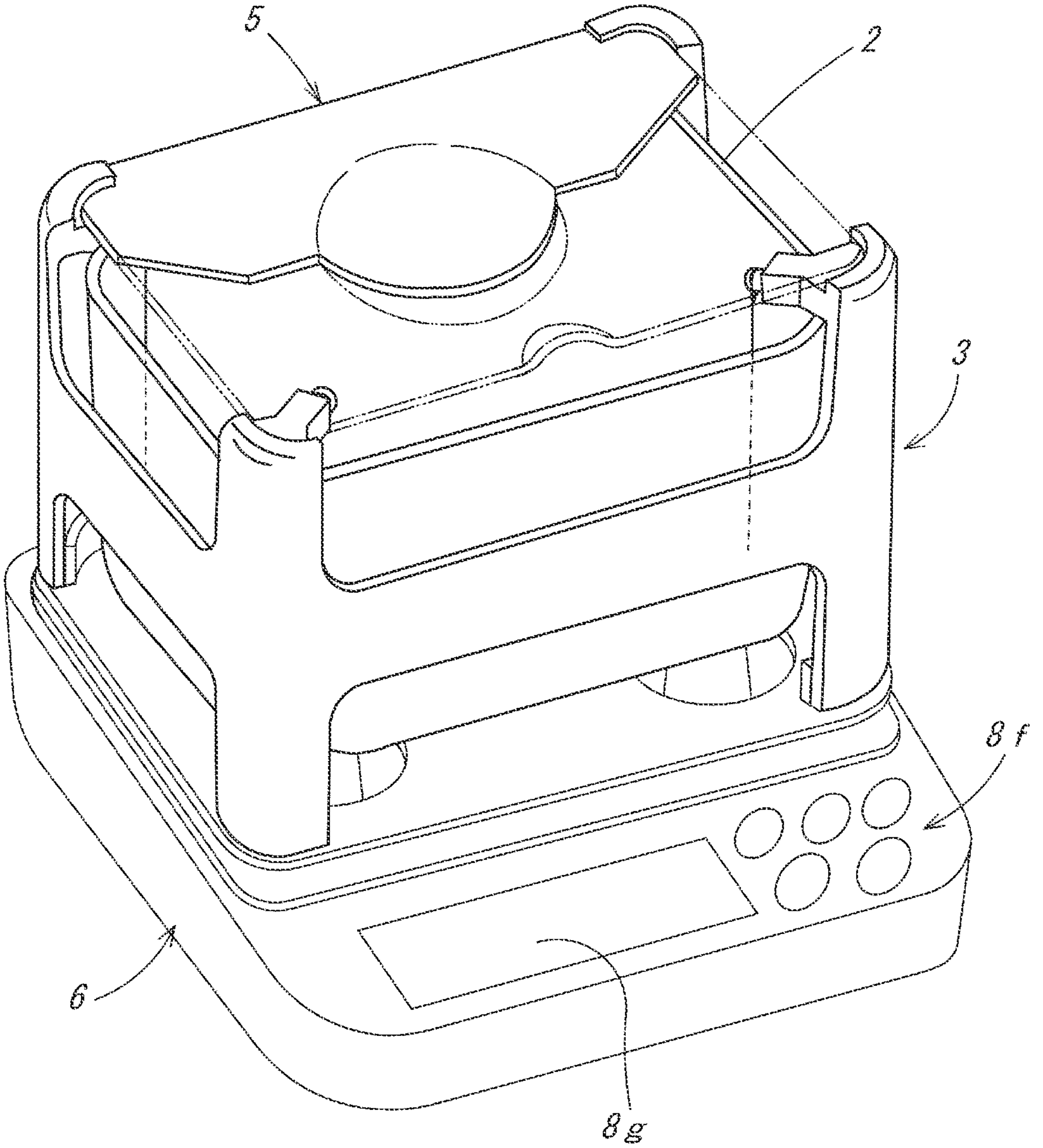
FIG. 1 is an external perspective view of a specific gravity measurement device according to an embodiment of the present invention, viewed from the front side.
Figure 2A:
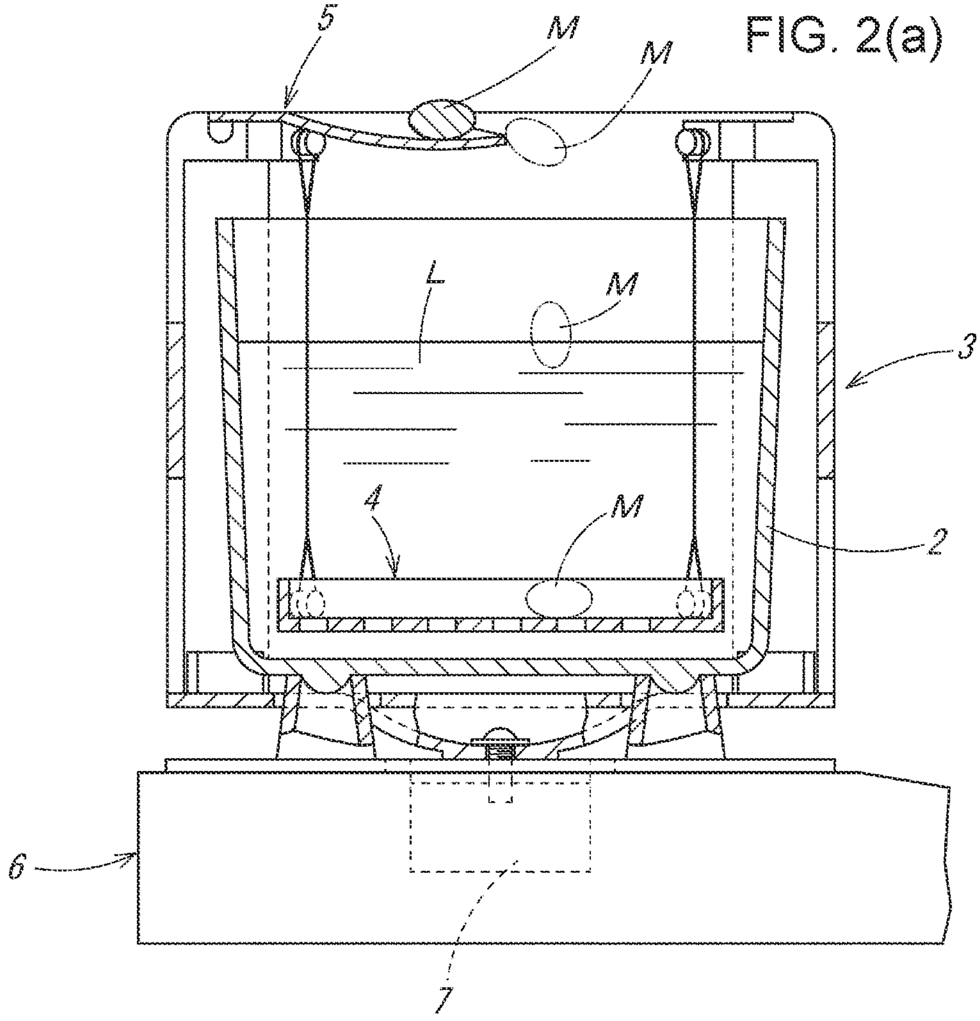
FIG. 2(*a*) is a vertical side cross-sectional view of the specific gravity measurement device according to the same embodiment and FIG. 2(*b*) is a block diagram of a measuring unit of the specific gravity measurement device according to the same embodiment.
Figure 2B:
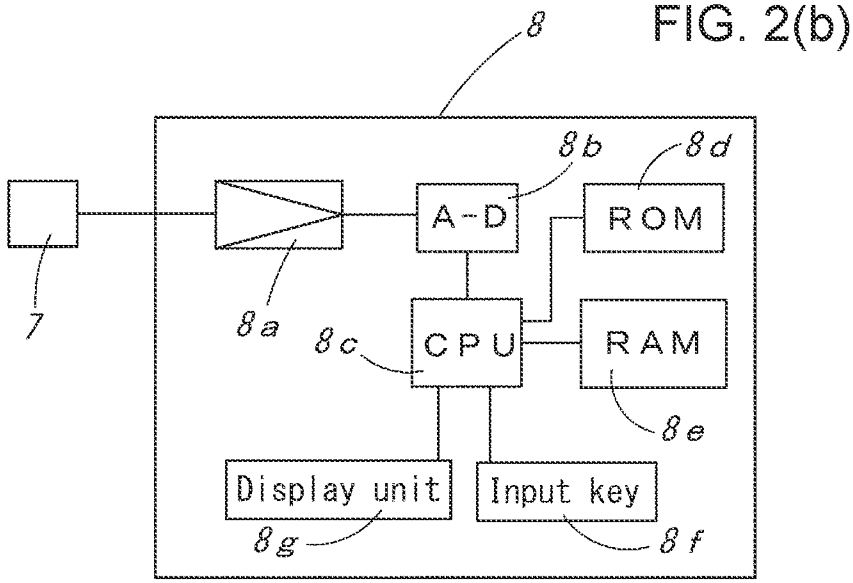
Figure 3:
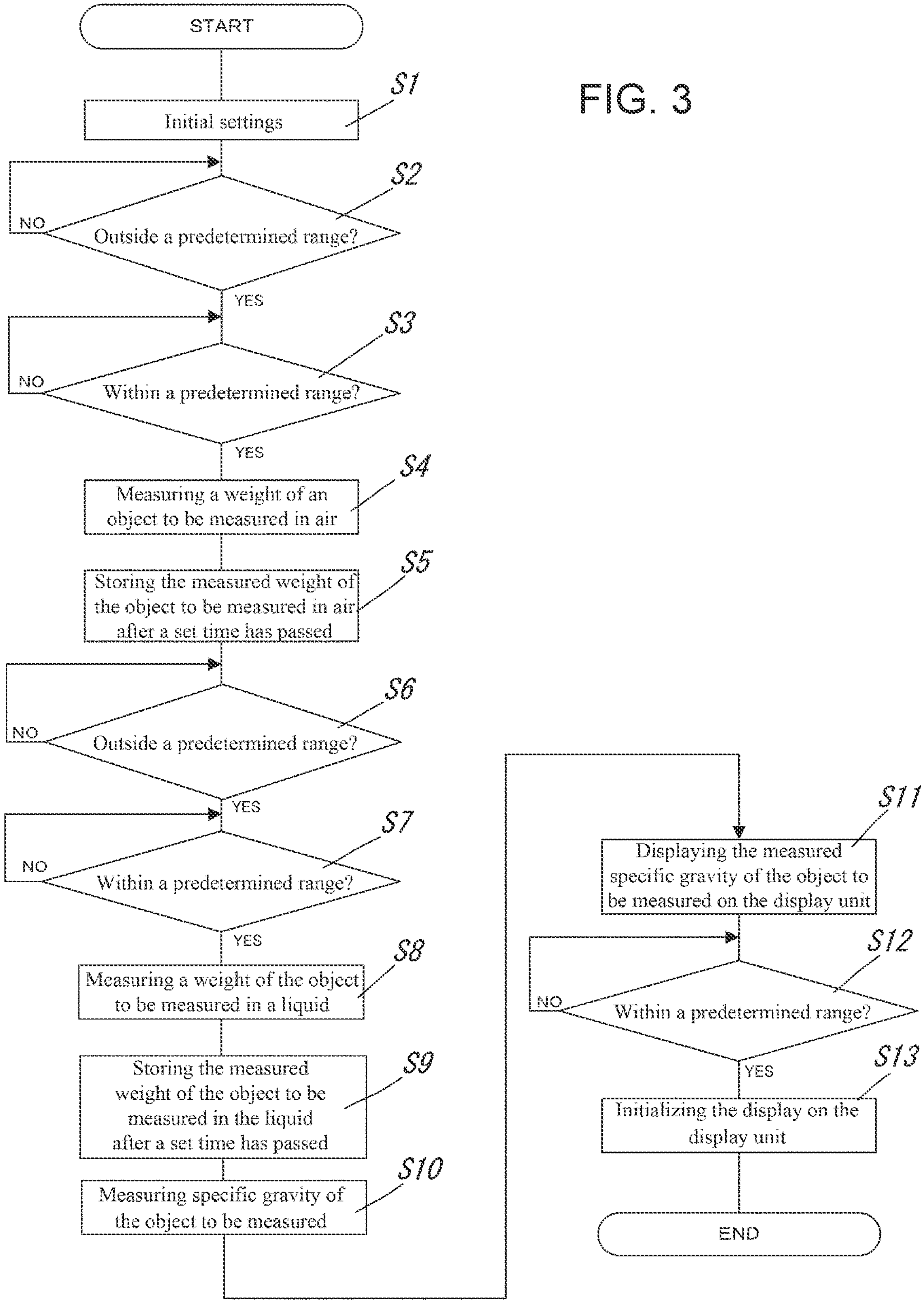
FIG. 3 is a flowchart for explaining a process when measuring specific gravity of an object to be measured using the specific gravity measurement device according to the same embodiment.

Referring to FIGS. 1-3, specific gravity measurement device 1 is composed of a rectangular cylindrical liquid tank 2 containing a liquid L, an object-to-be-measured receiving member 4 which is accommodated in the liquid tank 2 via a support unit 3 in a non-contact manner and into and out of which the liquid L in the liquid tank 2 can flow freely, a mid-air mounting member 5 on which an object to be measured M is placed when a weight of the object to be measured M in air is measured, and a measuring device 6 receiving and supporting the object-to-be-measured receiving member 4 via the support unit 3. The measuring device 6 includes an electromagnetic sensor 7 for converting a weight acting on the object-to-be-measured receiving member 4 into an electric signal and a measuring unit 8 (see FIG. 2(*b*)) for measuring specific gravity of the object to be measured M from an output of the sensor 7 when the object to be measured M is placed on the mid-air mounting member 5 and an output of the sensor 7 when the object to be measured M is submerged and placed on the object-to-be-measured receiving member 4. As shown in FIG. 2(*b*), the measuring unit 8 is composed of an amplifier 8*a* for amplifying the output of the sensor 7 and outputting an analog signal corresponding to the load, an A-D converter 8*b* for converting the analog signal into a digital signal, a CPU 8*c*, a ROM 8*d* storing a program, etc., a RAM 8*e* serving as a work area, a buffer memory, etc., an input key 8*f* capable of inputting various data, and a display unit 8*g* capable of displaying various contents.

Thus, a feature of the specific gravity measurement device 1 thus configured is a part related to processing contents when measuring the specific gravity of the object to be measured M. Thus, this point will be described specifically with reference to FIG. 3.

Referring to FIG. 3, first, a user makes initial settings (step S1). More specifically, the user presses the input key 8*f* (see FIG. 1) while the liquid L is in the liquid tank 2 as shown in FIG. 2(*a*) and the object to be measured M is neither placed on the mid-air mounting member 5 nor put into the liquid tank 2. As a result, the CPU 8*c* (see FIG. 2(*b*)) resets the output of the sensor 7, that is, the weights of the object-to-be-measured receiving member 4, the mid-air mounting member 5, and the support unit 3, and stores "0" in the RAM 8*e* and also causes the display unit 8*g* to display "0".

The user further presses the input key 8*f* (see FIG. 1) to set a time to pass (for example, 0 seconds, 5 seconds, 10 seconds, 15 seconds, 20 seconds, 30 seconds, etc.) before the weight of the object to be measured M in air measured by the sensor 7 is stored in the RAM 8*e*. This setting content is stored in the ROM 8*d* by the CPU 8*c*. The user further presses the input key 8*f* (see FIG. 1) to set a time to pass (for example, 0 seconds, 5 seconds, 10 seconds, 15 seconds, 20 seconds, 30 seconds, etc.) before the weight of the object to be measured M in the liquid measured by the sensor 7 is stored in the RAM 8*e*. This setting content is stored in the ROM 8*d* by the CPU 8*c*.

Thus, after such initial settings are made (step S1), the CPU 8*c* reads out a program stored in the ROM 8*d* and checks whether or not the output of the sensor 7 is outside a predetermined range (for example, −0.0001 g to 0.0001 g, 0 to 0.01 g, etc.) set in advance. More specifically, the CPU 8*c* checks the output of the sensor 7 at fixed intervals, obtains a difference between the previously checked output value from the sensor 7 and the currently checked output value from the sensor 7, and checks whether or not the value of the difference is outside a predetermined range (for example, −0.0001 g to 0.0001 g, 0 to 0.01 g, etc.) set in advance when the program was created (step S2). When not outside the predetermined range (for example, −0.0001 g to 0.0001 g, 0 to 0.01 g, etc.) (step S2: NO), the CPU 8*c* determines that the object to be measured M is not placed on the mid-air mounting member 5, and repeats the processing of step S2 until the value becomes outside the predetermined range (for example, −0.0001 g to 0.0001 g, 0 to 0.01 g, etc.). On the other hand, when the value is outside the predetermined range (for example, −0.0001 g to 0.0001 g, 0 to 0.01 g, etc.) (step S2: YES), the CPU 8*c* determines that the object to be measured M has been placed on the mid-air mounting member 5 by a person or robot, and moves onto the processing of step S3.

Next, the CPU 8*c* checks the output of the sensor 7 at fixed intervals, obtains a difference between the previously checked output value from the sensor 7 and the currently checked output value from the sensor 7, and checks whether or not the value of the difference is within a predetermined range (for example, −0.0001 g to 0.0001 g, 0 to 0.01 g, etc.) set in advance when the program was created (step S3). When not within the predetermined range (for example, −0.0001 g to 0.0001 g, 0 to 0.01 g, etc.) (step S3: NO), the CPU 8*c* determines that the output from the sensor 7 is not stable, and repeats the processing of step S3 until the value falls within the predetermined range (for example, −0.0001 g to 0.0001 g, 0 to 0.01 g, etc.). On the other hand, when the value is within the predetermined range (for example, −0.0001 g to 0.0001 g, 0 to 0.01 g, etc.) (step S3: YES), the CPU 8*c* determines that the currently checked output value from the sensor 7 is the weight of the object to be measured M in air. As a result, the weight of the object to be measured M in air is measured (step S4). At this time, the CPU 8*c* causes the display unit 8*g* to display the weight of the object to be measured M in air and also causes the display unit 8*g* to display an indication informing that the weight of the object to be measured M in air has been determined.

Next, the CPU 8*c* reads out, from the ROM 8*d*, the setting set in step S1 above as to the time to pass before the weight of the object to be measured M in air is stored in the RAM 8*e*, and stores the measured weight of the object to be measured M in air in the RAM 8*e* after the set time has passed (step S5). More specifically, for example, when the set time is 0 seconds, the CPU 8*c* stores the measured weight of the object to be measured M in air in the RAM 8*e* immediately after the weight of the object to be measured M in air is measured. When the set time is 5 seconds, the CPU 8*c* stores the measured weight of the object to be measured M in air in the RAM 8*e* after 5 seconds have passed since the weight of the object to be measured M in air was measured.

Thus, in this manner, the weight of the object to be measured M in air with high measurement accuracy can be automatically stored in the RAM 8*e* by taking the output value from the sensor 7 falling within the predetermined range as the weight of the object to be measured M in air and storing the weight in the RAM 8*e* immediately or after the predetermined time has passed.

Next, the CPU 8*c* checks the output of the sensor 7 at fixed intervals, obtains a difference between the previously checked output value from the sensor 7 and the currently checked output value from the sensor 7, and checks whether or not the value of the difference is outside a predetermined range (for example, −0.0001 g to 0.0001 g, 0 to 0.01 g, etc.) set in advance when the program was created (step S6). When not outside the predetermined range (for example, −0.0001 g to 0.0001 g, 0 to 0.01 g, etc.) (step S6: NO), the CPU 8*c* determines that the object to be measured M is not submerged in the object-to-be-measured receiving member 4, and repeats the processing of step S6 until the value becomes outside the predetermined range (for example, −0.0001 g to 0.0001 g, 0 to 0.01 g, etc.). On the other hand, when the value is outside the predetermined range (for example, −0.0001 g to 0.0001 g, 0 to 0.01 g, etc.) (step S6: YES), the CPU 8*c* determines that the object to be measured M has been submerged in the object-to-be-measured receiving member 4 by a person or robot, and moves onto the processing of step S7.

Next, the CPU 8*c* checks the output of the sensor 7 at fixed intervals, obtains a difference between the previously checked output value from the sensor 7 and the currently checked output value from the sensor 7, and checks whether or not the value of the difference is within a predetermined range (for example, −0.0001 g to 0.0001 g, 0 to 0.01 g, etc.) set in advance (step S7). When not within the predetermined range (for example, −0.0001 g to 0.0001 g, 0 to 0.01 g, etc.) (step S7: NO), the CPU 8*c* determines that the output from the sensor 7 is not stable, and repeats the processing of step S7 until the value falls within the predetermined range (for example, −0.0001 g to 0.0001 g, 0 to 0.01 g, etc.). On the other hand, when the value is within the predetermined range (for example, −0.0001 g to 0.0001 g, 0 to 0.01 g, etc.) (step S7: YES), the CPU 8*c* determines that the currently checked output value from the sensor 7 is the weight of the object to be measured M in the liquid. As a result, the weight of the object to be measured M in the liquid is measured (step S8). At this time, the CPU 8*c* causes the display unit 8*g* to display the weight of the object to be measured M in the liquid and also causes the display unit 8*g* to display an indication informing that the weight of the object to be measured M in the liquid has been determined.

Next, the CPU 8*c* reads out, from the ROM 8*d*, the setting set in step S1 above as to the time to pass before the weight of the object to be measured M in the liquid is stored in the RAM 8*e*, and stores the measured weight of the object to be measured M in the liquid in the RAM 8*e* after the set time has passed (step S9). More specifically, for example, when the set time is 0 seconds, the CPU 8*c* stores the measured weight of the object to be measured M in the liquid in the RAM 8*e* immediately after the weight of the object to be measured M in the liquid is measured. When the set time is 5 seconds, the CPU 8*c* stores the measured weight of the object to be measured M in the liquid in the RAM 8*e* after 5 seconds have passed since the weight of the object to be measured M in the liquid was measured.

Thus, in this manner, the weight of the object to be measured M in the liquid with high measurement accuracy can be automatically stored in the RAM 8*e* by taking the output value from the sensor 7 falling within the predetermined range as the weight of the object to be measured M in the liquid and storing the weight in the RAM 8*e* immediately or after the predetermined time has passed.

Next, the CPU 8*c* reads out the weight of the object to be measured M in air and the weight of the object to be measured M in the liquid automatically stored in the RAM 8*e*, and measures specific gravity of the object to be measured M. More specifically, the CPU 8*c* measures specific gravity of the object to be measured M by calculating using the numerical expression of the weight of the object to be measured M in air/(the weight of the object to be measured M in air−the weight of the object to be measured M in the liquid) (step S10).

Next, the CPU 8*c* causes the display unit 8*g* to display the measured specific gravity of the object to be measured M (step S11).

Next, the CPU 8*c* checks the output of the sensor 7 at fixed intervals and checks whether or not the output value from the sensor 7 is within a predetermined range (for example, a range of 0 to 0.0001 g) set in advance when the program was created (step S12). When not within the predetermined range (for example, the range of 0 to 0.0001 g) (step S12: NO), the CPU 8*c* determines that a person or robot has not taken out the object to be measured M from the object-to-be-measured receiving member 4, and repeats the processing of step S12 until the output value falls within the predetermined range (for example, the range of 0 to 0.0001 g). On the other hand, when within the predetermined range (for example, the range of 0 to 0.0001 g) (step S12: YES), the CPU 8*c* determines that a person or robot has taken out the object to be measured M from the object-to-be-measured receiving member 4, and initializes the specific gravity of the object to be measured M displayed on the display unit 8*g* (causes the display unit 8*g* to display "0") (step S13). At this time, the CPU 8*c* also clears the weight of the object to be measured M in air and the weight of the object to be measured M in the liquid automatically stored in the RAM 8*e*.

In this manner, the specific gravity of the object to be measured M displayed on the display unit 8*g* is initialized ("0" is displayed) when the output value of the sensor 7 falls within the predetermined range (for example, the range of 0 to 0.0001 g). By doing so, the occurrence of troubles such as a situation where the display disappears although the specific gravity of the object to be measured M is not checked can be reduced.

Thus, the CPU 8*c* completes the specific gravity measurement processing of the object to be measured M after completing the processing of step S13 above. If specific gravity of another object to be measured M is to be measured successively with the initial settings (see step S1) kept as they are, the processing of step S2 to step S13 only needs to be performed.

Thus, according to the present embodiment described above, the measured weight of the object to be measured M in air is automatically stored in the RAM 8*e*, the measured weight of the object to be measured M in the liquid is automatically stored in the RAM 8*e*, the specific gravity of the object to be measured M is measured using the weight of the object to be measured M in air and the weight of the object to be measured M in the liquid stored in the RAM 8*e*, and the measured specific gravity is displayed on the display unit 8*g*. When the object to be measured M is taken out of the liquid, the display of the specific gravity displayed on the display unit 8*g* is automatically initialized. This makes it possible to automate the specific gravity measurement work, thereby eliminating the need to press the input key 8*f* as in the conventional case, so that measurement errors due to artificial vibration can be reduced substantially close to zero. As a result, according to the present embodiment, measurement errors can be significantly reduced, and thus, a true specific gravity value can be repeatedly measured. Further, according to the present embodiment, the work using a robot is also possible.

The specific gravity measurement device shown in the present embodiment is merely an example and various modifications and changes can be made within the scope of the gist of the present invention described in the claims. For example, the structure of the specific gravity measurement device is not limited to the structure shown in the present embodiment, and the present invention can be applied to a specific gravity measurement device of any structure. For example, the present invention can be applied to such a specific gravity measurement device that a weight of an object to be measured M in air is known in advance without measurement, a weight of the object to be measured M in a liquid is measured, and specific gravity of the object to be measured M is measured using the previously known weight of the object to be measured M in air and the measured weight of the object to be measured M in the liquid. At this time, the processing of step S2 to step S6 shown in FIG. 3 becomes unnecessary, and the user inputs the previously known weight of the object to be measured M in air using the input key 8*f* in step S1.

Further, in the present embodiment, the same predetermined range is given as an example in measuring the weight of the object to be measured M in air and the weight of the object to be measured M in the liquid. However, the present invention is not limited thereto, and the predetermined range may be set to different ranges in measuring the weight of the object to be measured M in air and the weight of the object to be measured M in the liquid, respectively.

Further, in the present embodiment, the example in which the predetermined range is set in advance when the program is created has been shown. However, the present invention is not limited thereto, and the user may optionally set the predetermined range. At this time, the user sets it using the input key 8*f* in the processing of step S1. It is a matter of course that the user may optionally set all the predetermined ranges in step S3, step S7, and step S12 shown in FIG. 3 or may optionally set any of the predetermined ranges.

On the other hand, the determinations that the object to be measured M has been placed on the mid-air mounting member 5 and that the object to be measured M has been submerged in the object-to-be-measured receiving member 4 by the CPU 8*c* shown in the present embodiment are merely examples, and any method of determination is acceptable and the present invention is not limited thereto.

What is claimed is:

1. A specific gravity measurement device, comprising:

a weight measuring device having a storage device and a display device;

the weight measuring device being operable to measure an in-air weight an object to be measured, where the in-air weight is a weight of the object to be measure in air;

the weight measuring device being operable to measure an in-liquid weight of the object to be measured, where the in-liquid weight is a weight of the object to be measured in a liquid;

the specific gravity measurement device being operable to automatically store the in-air weight and the in-liquid weight in the storage device;

the specific gravity measurement device being operable to calculate a specific gravity of the object to be measured based on the in-air weight and the in-liquid weight stored in the storage device; and the specific gravity measurement device being operable to automatically initialize a displayed amount of the specific gravity of the object to be measured on the display device after the object to be measured is taken out of the liquid.

2. The specific gravity measurement device according to claim 1, wherein the specific gravity measurement device is operable to automatically store the in-air weight in the storage device when a difference in measurements of the in-air weight falls within a predetermined range, or is operable to automatically store the in-air weight in the storage device after a predetermined time has passed since the difference fell within the predetermined range.

3. The specific gravity measurement device according to claim 2, wherein the weight measuring device is operable to automatically store the in-liquid weight in the storage device when a difference in measurements of the in-liquid weight falls within a predetermined range, or is operable to automatically store the in-liquid weight in the storage device after a predetermined time has passed since the difference fell within the predetermined range.

4. The specific gravity measurement device according to claim 1, wherein the specific gravity measurement device is operable to automatically store the in-liquid weight in the storage device when a difference in measurements of the in-liquid weight falls within a predetermined range, or is operable to automatically store the in-liquid weight in the storage device after a predetermined time has passed since the difference fell within the predetermined range.

5. The specific gravity measurement device according to claim 1, wherein the specific gravity measurement device is operable to automatically initialize the display of the specific gravity displayed on the display device when a value of the in-liquid weight falls within a predetermined range after the object to be measured is taken out of the liquid.

6. A specific gravity measurement device, comprising:

a weight measuring device having a storage device and a display device;

the weight measuring device being operable to measure an in-liquid weight of the object to be measured, where the in-liquid weight is a weight of the object to be measured in a liquid;

the specific gravity measurement device being operable to automatically store the in-liquid weight in the storage device;

the specific gravity measurement device being operable to calculate a specific gravity of the object to be measured based on an in-air weight of the object to be measured and the in-liquid weight stored in the storage device; and the specific gravity measurement device being operable to automatically initialize a displayed amount of the specific gravity of the object to be measured on the display device after the object to be measured is taken out of the liquid.

7. The specific gravity measurement device according to claim 6, wherein specific gravity measurement device is operable to automatically store the in-liquid weight in the storage device when a difference in measurements of the in-liquid weight falls within a predetermined range, or is operable to automatically store the in-liquid weight in the storage device after a predetermined time has passed since the difference fell within the predetermined range.

8. The specific gravity measurement device according to claim 6, wherein the specific gravity measurement device is operable to automatically initialize the display of the specific gravity displayed on the display device when a value of the in- liquid weight falls within a predetermined range after the object to be measured is taken out of the liquid.

* * * * *